Jan. 22, 1963 R. DALLEMAGNE 3,075,129
CODED SIGNAL RECEIVING AND SHAPING CIRCUIT
Filed Feb. 23, 1961
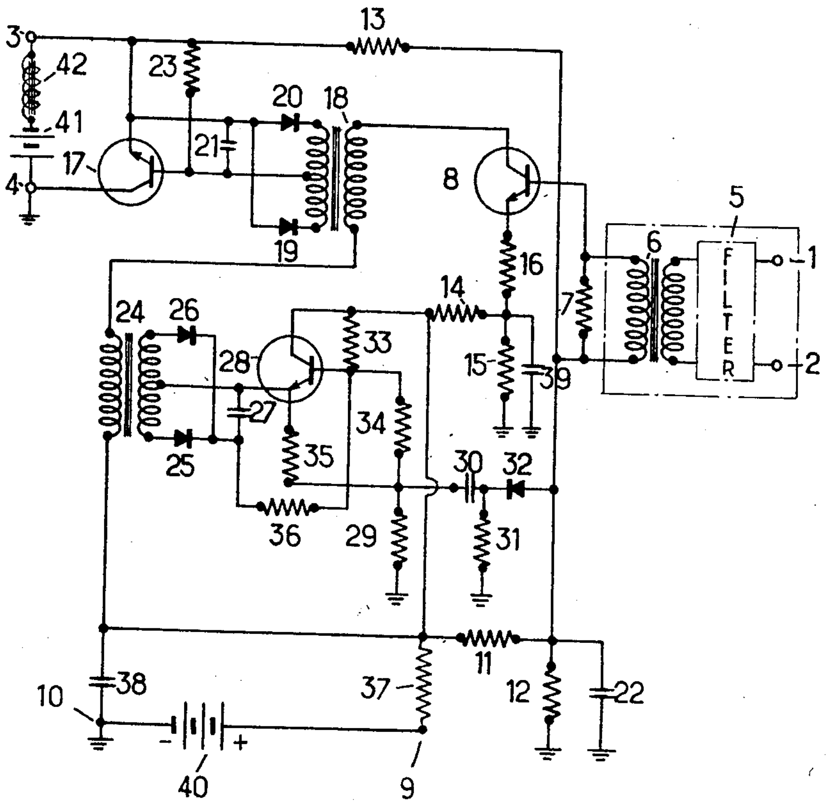

United States Patent Office 3,075,129 Patented Jan. 22, 1963

3,075,129

CODED SIGNAL RECEIVING AND SHAPING CIRCUIT

Robert Dallemagne, 34 Rue Pieplu, Conflans-Sainte-Honorine, Seine and Oise, France Filed Feb. 23, 1961, Ser. No. 91,150
Claims priority, application France Apr. 6, 1960
7 Claims. (Cl. 317—148.5)

The present invention relates to a new circuit for the receiving and shaping of amplitude-modulated carrier current signals, the original rectangular envelope wave shape of which has been more or less distorted in wave propagation from a transmitting to a receiving station, either by the action of the propagation medium or by that of frequency selective filters used for protecting said signals against spurious signals of neighboring frequencies.

Such signals are commonly used as telegraph signals, or for the transmission of coded data, or as selection, call and supervision signals in long-distance automatic switching telephone networks. They are usually produced from direct-current coded signals of practically perfect rectangular wave shape operating various types of keying devices, such as electromechanical relays or equivalent electronic devices, which cause said D.C. signals to modulate a sinusoidal carrier current, the frequency of which may be a tone frequency or a high frequency, such as that of a channel carrier wave in a carrier current multiplex telephone system.

At the receiving end of a communication system wherethrough such coded signals are transmitted, the distortion they undergo from the various above-mentioned causes appears as a decrease in the steepness of both the leading and trailing edges of the envelope of each individual signal, the distortion of the trailing edge often resulting in an apparent lengthening of the duration of said signal. Consequently, a corresponding distortion appears in the D.C. signals restituted after detection of the carrier current signals. This in turn alters the duration of signals retransmitted by any further apparatus, such as electromechanical relays, for the operation of which the restituted D.C. signals are used.

On another hand, it is obvious that the instantaneous amplitude of a signal having a distorted wave shape is, at each point of its leading and trailing edges, proportional to its maximum amplitude. Therefore, the instants when the instantaneous amplitude of the restituted D.C. signals reaches the critical values corresponding to the beginning and the end of the operation of any further apparatus they control depend on said maximum amplitude, this resulting in turn in a change in the duration of the signals retransmitted by said apparatus with respect to their duration at the transmitting end of the system, the amount of the change depending on the value of the latter amplitude.

The object of the invention is a device capable of transforming more or less distorted received carrier current signals into direct-current signals of practically perfect rectangular wave shape and also, as far as possible, of restoring the so transformed signals their original duration in order to enable them to properly operate apparatus for their utilization or further retransmission.

According to the invention, there is provided a carrier-current coded signal receiving system comprising a pair of input terminals at which a carrier-current signal voltage is received, a first transistor so biased as to have but a very low gain in its rest condition, means for applying said signal voltage to a control electrode of said first transistor, means for transmitting part of the amplified signal voltage from the output circuit of said first transistor to a first rectifier circuit, means for applying the rectified voltage from said first rectifier circuit to a control electrode of a second transistor so based in its rest condition as to have a substantially zero collector current, a load resistance in the collector circuit of said second transistor, a first feedback circuit feeding part of the D.C. voltage across said resistance to said control electrode of said first transistor, a second feedback circuit comprising means for transmitting a further part of said amplified signal voltage to a second rectifier circuit, a third transistor amplifying the D.C. voltage delivered by said second rectifier circuit, a time-differentiating circuit deriving from said amplified D.C. voltage a pulse voltage and asymmetrically conducting connection means for applying said pulse voltage to said control electrode of said first transistor so as to suddenly decrease its gain when said signal voltage disappears; said system further comprising means for applying the collector current of said second transistor to a working circuit.

The said working circuit may consist, for instance, of a winding of an electromechanical relay.

In the hereinafter given description, the hereabove mentioned second transistor will be referred to as "the relay transistor" since, in the device of the invention, said second transistor operates like an "on-off" switch having but a nonconducting and a conducting operating condition with practically no intermediate condition; i.e., its operation is very similar to that of an electro-mechanical relay.

The invention will now be described in greater detail with the aid of the annexed drawing in which an example of its embodiment is shown.

The device shown in the drawing may be described as comprised of two parts, a "signal retransmitter" proper and a dual feedback circuit. The signal retransmitter essentially comprises a carrier frequency first amplifier stage receiving at its input signals from a transmission circuit and the output of which is fed to a rectifier, the D.C. output of which controls a second amplifier stage, the output current of which operates a utilization circuit. The feedback circuit is an essentially non-linear one and its purpose is to cause a sudden increase in the gain of said first amplifier stage at the beginning of a signal and a sudden decrease of said gain at the end of the same signal.

Referring to the drawing, signals arriving at terminals 1 and 2 pass through a narrow band-pass filter 5, the purpose of which is to eliminate spurious frequency currents which might disturb the operation of the system, and, from the output of 5, are transmitted to a transformer 6, the secondary winding of which is shunted by a resistance 7, which provides a suitable termination impedance for the filter. One terminal of this secondary winding is connected to the base electrode of a NPN transistor 8, preferably a germanium transistor.

A permanent biassing voltage is applied to the base electrode of transistor 8. This biassing voltage is obtained on one hand from the D.C. source 40 (for instance a 24 volt storage battery) connected between terminals 9 and 10, the latter of which is a constant potential point hereafter designated as a ground, by means of a voltage divider consisting of resistances 11 and 12 and fed through resistance 37 from source 40, and on the other hand from the voltage of a second D.C. source 41 (for instance a 48 volt storage battery as found in any telephone exchange), one terminal 4 of which is also grounded, through the impedance of the winding 42 of an electro mechanical relay of a working circuit and a further voltage divider consisting of resistances 12 and 13. The emitter electrode of transistor 8 is also biassed from the D.C. voltage source 40 by means of a third voltage divider consisting of resistances 14 and 15. In its rest condition, the bias of transistor 8 is adjusted in such a way as to reduce its collector current to some tens of microamperes, which leaves but a very low gain to the amplifier stage constituted by 8.

An adjustable resistance 16 provides a local negative feedback in the emitter circuit of transistor 8, to give the emitter-base electrode impedance of this transistor a sufficiently high value to avoid any noticeable loading of the output of filter 5.

The collector circuit of transistor 8 feeds two circuits, the control circuit of the relay transistor 17 and the second feedback circuit, the main object of which is to improve the wave shape of the trailing edge of the signal delivered at the output terminals 3, 4 of the whole system.

The control circuit of the relay transistor 17 consists of a transformer 18 linking the collector circuit of 8 with a rectifying device comprising a pair of rectifiers 19, 20 and a filtering condenser 21. Rectifying both signal half-waves by a device including two rectifiers has the advantage of substantially reducing the level of the residual alternating current component at the output of the rectifier system, thus avoiding possible negative or positive feedback which might occur at the carrier current frequency by means of the return circuit constituted by resistances 12 and 13. Condenser 22 in parallel connection with resistance 12 further reduces the level of any alternating voltage possibly developed across 12, while condensers 38 and 39 play similar parts with respect to resistances 37 and 16. Furthermore, the two-rectifier system is more economical than a bridge four-rectifier system and is better adapted to the low impedance of the particular circuit it feeds in the presently described device.

The operation of the system is as follows: when no signals are received, transistor 17 has a practically zero collector current owing to the spontaneous biassing which appears at its base-emitter junction. When a signal is received, the bias of the base electrode of transistor 17 is changed by the voltage developed across condenser 21 by the operation of the amplifying transistor 8 and the control circuit consisting of transformer 18 and rectifiers 19, 20; transistor 17 begins to pass into its conducting condition. The weak current flowing in its collector circuit causes a voltage drop to appear across the impedance of the working circuit 42, which decreases the potential difference between terminals 3 and 4. This in turn changes the bias of the base electrode of transistor 8 by means of the first feedback circuit consisting of the voltage divider 12—13 and increases the gain of the latter transistor. It results therefrom a positive feedback effect which increases the D.C. voltage across 21 and rapidly drives the collector current of 17 to its saturation value. At the end of the signal the reverse process takes place.

The sudden gain variation of the amplifier stage comprising transistor 8 causes transistor 17 to pass from its conducting to its non-conducting condition, or conversely, and prevents the existence during any appreciable time of an intermediate condition with an average voltage between the collector and emitter of 17 and an average current intensity in its collector-emitter-circuit. These average values would correspond to a high power dissipation condition in transistor 17, which could damage and even destroy the latter.

The relay transistor 17 may be, for instance, a NPN silicon transistor. In its rest condition, the current flowing through resistance 23 and the base-emitter junction of transistor 17 provides a high enough voltage difference between the corresponding electrodes to "block" the transistor, i.e. to keep its collector current at a practically zero value.

Transistor 17 preferably is a silicon transistor having a high emitter-collector breakdown voltage, which enables it to withstand overvoltages of the order of 120 volts which can appear when its collector current is suddenly cut off across an inductive loading such as a winding of an electromechanical relay.

The purpose of the already mentioned second feedback circuit is to further accelerate the just described process. This circuit comprises a transformer 24, the primary winding of which is connected in series with the primary winding of transformer 18 in the collector circuit of 8 and the carrier frequency voltage developed across the secondary winding of which is applied to a rectifying device including two rectifiers 25, 26 and a filtering condenser 27. The rectified voltage developed across 27 is applied between the base and emitter electrodes of a third transistor 28, for example a germanium transistor, which operates as a D.C. amplifier.

The voltage generated across resistance 29 by the collector current of transistor 28 is transformed into positive or negative pulses by the time-differentiator circuit constituted by the small capacity condenser 30 and resistance 31.

A positive voltage pulse is thus generated at the beginning of each received signal and a negative one at its end. Each negative pulse is applied to the base electrode of the input transistor 8 to change its bias voltage and so to cause the blocking of its collector-current as soon as the amplitude of the received signal starts decreasing. The differentiator circuit is connected to the base electrode of 8 through a rectifier 32, the purpose of which is to allow negative pulses only to be transmitted to said base electrode and to introduce a high incremental resistance into the circuit in the absence of negative pulses, in order to avoid undesirable permanent feedback in this circuit in its rest condition.

A D.C. voltage divider including resistances 33 and 34 together with resistance 29 provides the biassing voltages for the base and emitter electrodes of transistor 28. A further resistance 35 is also used for the biassing of the emitter of said transistor 28, while resistance 36 provides a connection between the base electrode of 28 and the rectifying circuit 25, 26, 27.

A condenser 38 is connected across resistance 37 in order to reduce spurious voltages which might be transmitted from the terminals 9 and 10 of the D.C. source 40.

Finally, condenser 39, in parallel connection with the bias resistance 15, eliminates the negative feedback effect of the latter resistance.

It would, of course, also be possible to use other transistor types than those mentioned in the above-given description, for instance transistors of the PNP type, subject to the condition of accordingly selecting the polarities of the D.C. sources.

What is claimed is:

1. A carrier-current coded signal receiving system comprising a pair of input terminals at which a carrier-current signal voltage is received, a first transistor so biassed as to have but a very low gain in its rest condition, means for applying said signal voltage to a control electrode of said first transistor, means for transmitting part of the amplified signal voltage from the output circuit of said first transistor to a first rectifier circuit, means for applying the rectified voltage from said first rectifier circuit to a control electrode of a second transistor so biassed in its rest condition as to have a substantially zero collector current, a load resistance in the collector circuit of said second transistor, a first feedback circuit feeding part of the D.C. voltage across said resistance to said control electrode of said first transistor, a second feedback circuit comprising means for transmitting a further part of said amplified signal voltage to a second rectifier circuit, a third transistor amplifying the D.C. voltage delivered by said second rectifier circuit, a time-differentiating circuit deriving from said amplified D.C. voltage a pulse voltage, and asymmetrically conducting connection means for applying said pulse voltage to said control electrode of said first transistor so as to suddenly decrease its gain when said signal voltage disappears; said system further comprising means for applying the collector current of said second transistor to a working circuit.

2. A coded signal receiving system as claimed in claim 1, wherein said first feedback circuit comprises direct-current connecting means between the emitter electrode of said second transistor and the base electrode of said first transistor.

3. A coded signal receiving system as claimed in claim 1, wherein said first feedback circuit consists of a further resistance connecting said emitter of said second transistor to the common point to two series-connected resistances forming a voltage divider from which a direct-current voltage biassing the base electrode of said first transistor is derived.

4. A coded signal receiving system as claimed in claim 1, wherein said control electrode of said first transistor is its base electrode, and wherein said asymmetrically conducting connection means include a rectifying diode.

5. A coded signal receiving system as claimed in claim 4, wherein said rectifying diode in said connection means is connected with its direction of higher resistance so oriented as to prevent positive pulses to be transmitted to said control electrode of said second transistor.

6. A coded signal receiving system as claimed in claim 1, wherein said first and third transistors are germanium transistors and wherein said second transistor is a silicon transistor.

7. A coded signal receiving system as claimed in claim 1, wherein said working circuit consists of a winding of an electromechanical relay.

References Cited in the file of this patent

Benson: "Pulse Sharpening Device," I.B.M. Technical Disclosure Bulletin, vol. 2, No. 4, December 1959, pp. 75, 76.